United States Patent
Hawley (10) Patent No.: US 12,286,109 B2
(45) Date of Patent: Apr. 29, 2025

(54) ADAPTIVE DRIVEFORCE FOR SPEED LIMIT CONTROL

(71) Applicant: Toyota Motor Engineering & Manufacturing North America, Inc., Plano, TX (US)

(72) Inventor: Thomas S. Hawley, Ann Arbor, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA (JP)

( * ) Notice: Subject to any disclaimer, the term of this patent is extended or adjusted under 35 U.S.C. 154(b) by 215 days.

(21) Appl. No.: 18/089,295

(22) Filed: Dec. 27, 2022

(65) Prior Publication Data

US 2024/0208498 A1  Jun. 27, 2024

(51) Int. Cl.
| | |
|---|---|
| *B60W 30/14* | (2006.01) |
| *B60W 40/076* | (2012.01) |
| *B60W 40/107* | (2012.01) |
| *B60W 40/13* | (2012.01) |
| *G06V 20/58* | (2022.01) |

(52) U.S. Cl.
CPC ........ *B60W 30/143* (2013.01); *B60W 40/076* (2013.01); *B60W 40/107* (2013.01); *B60W 40/13* (2013.01); *G06V 20/582* (2022.01); *B60W 2420/403* (2013.01); *B60W 2520/105* (2013.01); *B60W 2530/10* (2013.01); *B60W 2540/106* (2013.01); *B60W 2540/12* (2013.01); *B60W 2552/15* (2020.02); *B60W 2555/60* (2020.02); *B60W 2556/50* (2020.02)

(58) Field of Classification Search
CPC .. B60W 30/14; B60W 30/143; B60W 40/076; B60W 40/107; B60W 40/13; B60W 2420/403; B60W 2520/105; B60W 2520/10; B60W 2540/106; B60W 2540/12; B60W 2552/15; B60W 2555/60; B60W 2556/50; G06V 20/582
USPC .......................................................... 701/93
See application file for complete search history.

(56) References Cited

U.S. PATENT DOCUMENTS

| | | |
|---|---|---|
| 6,640,179 B2 | 10/2003 | Katakura et al. |
| 7,140,460 B2 | 11/2006 | Shimizu et al. |
| 7,363,116 B2 | 4/2008 | Fletchner et al. |
| 7,921,945 B2 | 4/2011 | Harris |
| 8,090,514 B2 | 1/2012 | Tarasinski et al. |
| 8,155,879 B2 | 4/2012 | Takagi et al. |
| 8,596,390 B2 | 12/2013 | Soliman et al. |

(Continued)

FOREIGN PATENT DOCUMENTS

| | | | | |
|---|---|---|---|---|
| CN | 101624016 B | * | 11/2012 | ............. B60K 31/00 |
| CN | 104718114 A | * | 6/2015 | ............. B60K 28/16 |

(Continued)

*Primary Examiner* — Atul Trivedi (74) *Attorney, Agent, or Firm* — Snell & Wilmer LLP (57) ABSTRACT

Methods, systems, devices and apparatuses for a driveforce speed control system for a vehicle. The driveforce speed control system includes a sensor configured to detect a speed limit, and an electronic control unit (ECU) coupled to the sensor. The ECU is configured to calculate a road load and a mass condition, determine a speed limit based on the sensor, and activate a speed control based on the road load, the mass condition, and the speed limit.

16 Claims, 8 Drawing Sheets

(56) References Cited

U.S. PATENT DOCUMENTS

| | | |
|---|---|---|
| 8,620,498 B2 | 12/2013 | Zerbini et al. |
| 8,706,378 B2 | 4/2014 | Choby |
| 8,751,124 B2 | 6/2014 | Ahn |
| 8,784,267 B2 | 7/2014 | Staudinger et al. |
| 9,199,640 B2 | 12/2015 | Weston et al. |
| 9,290,173 B2 | 3/2016 | Kobayashi et al. |
| 9,395,233 B2 | 7/2016 | Dourra et al. |
| 10,940,862 B1* | 3/2021 | Dempsey ........ B60W 30/18136 |
| 2007/0271017 A1 | 11/2007 | Samie |
| 2015/0197247 A1* | 7/2015 | Ichinokawa ........ B60W 30/143 |
| | | 701/93 |
| 2015/0210282 A1* | 7/2015 | Fairgrieve ........... F16H 61/0213 |
| | | 701/93 |
| 2015/0217766 A1* | 8/2015 | Kelly ................. B60W 10/184 |
| | | 701/94 |
| 2017/0274878 A1* | 9/2017 | Fairgrieve ........... F16H 61/0213 |
| 2018/0257655 A1* | 9/2018 | Westover ............. B60W 10/06 |
| 2019/0232950 A1* | 8/2019 | Atluri .................... H04W 4/02 |
| 2022/0134979 A1* | 5/2022 | Holub ................... B60W 10/10 |
| | | 701/22 |
| 2022/0227237 A1* | 7/2022 | Otanez ................ B60L 15/2009 |
| 2022/0314995 A1* | 10/2022 | Lerner ............ B60W 30/18018 |
| 2023/0125618 A1* | 4/2023 | Hawley ................ B60W 10/18 |
| | | 701/70 |
| 2023/0160707 A1* | 5/2023 | Kibalama ............... B60L 50/61 |
| | | 701/22 |
| 2024/0359694 A1* | 10/2024 | Austin ................. B60W 50/14 |

FOREIGN PATENT DOCUMENTS

| | | | | |
|---|---|---|---|---|
| CN | 105683022 B | * | 8/2019 | ............ B60K 31/042 |
| CN | 111806231 A | * | 10/2020 | ............. B60K 31/00 |
| CN | 113874237 A | * | 12/2021 | ............. B60K 26/00 |
| CN | 114312827 A | * | 4/2022 | ............. B60W 10/04 |
| EP | 2168831 A1 | * | 3/2010 | ............. B60W 10/08 |
| EP | 2168832 A1 | * | 3/2010 | ......... B60K 31/0066 |
| WO | WO-2018047873 A1 | * | 3/2018 | ................. B60T 7/12 |
| WO | WO-2018047874 A1 | * | 3/2018 | ............. B60T 8/1755 |

* cited by examiner

ADAPTIVE DRIVEFORCE FOR SPEED LIMIT CONTROL

BACKGROUND

Field

This disclosure relates to a system, method, apparatus and/or device for adjusting drive force and pedal mapping.

Description of the Related Art

Current vehicle systems may include a base drive force and pedal mapping. Such systems do not provide a speed control for the vehicle in various driving conditions. For example, the drive force and the acceleration are constant or fixed. However, it is desirable to drive a vehicle with an ability to accelerate and/or decelerate consistently regardless of a road grade, for instance, so a driver does not have to have as fine of motor control. As such, there is a need for systems and methods to selectively adjust to a road load map associated with the current driving condition and adjusting the drive force accordingly to create a more consistent feel through the pedal for an operator of the vehicle.

SUMMARY

One aspect of the subject matter described in this disclosure may be embodied in a driveforce speed control system for a vehicle. The driveforce speed control system includes a sensor configured to detect a speed limit, and an electronic control unit (ECU) coupled to the sensor. The ECU is configured to calculate a road load and a mass condition, determine a speed limit based on the sensor, and activate the speed control based on the road load, the mass condition, and/or the speed limit.

In one aspect, a method for controlling a pedal to driveforce mapping of a vehicle to maintain a speed and adjust and compensate for changes in mass condition and/or road condition includes calculating a road load and a mass condition, determining a speed limit, and activating the speed control based on the road load, the mass condition, and/or the speed limit.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale and may be exaggerated to better illustrate the important features of the present invention.

DETAILED DESCRIPTION

Disclosed herein are systems, apparatuses, and methods for a driveforce speed control system that detects a driving condition and adjusts a pedal gain accordingly, thus allowing the pedal control for the driver to feel the same in all driving conditions. Particularly, the driveforce speed control system dynamically changes the drive force and the acceleration feeling for a driver to match the environment. For instance, the driveforce speed control system may allow an acceleration for an increase or decrease in a pedal percentage to remain the same during all driving conditions, taking into account road conditions and vehicle conditions. This allows the pedal control for the driver to feel the same in all driving conditions. The drive force and the acceleration feeling dynamically change to match the environment.

The driveforce speed control system may monitor and estimate road load (RL) and mass condition (MC) of the vehicle and constantly monitor speed limit through data from GPS and/or camera sign detection. Once the driveforce speed control system is activated, the driveforce speed control system dynamically modifies the drive force mapping. For instance, the drive force may be adjusted dependent on the road grade (e.g., the road grade is not changing, increasing, or decreasing). Further, the driveforce speed control system may be deactivated in response to a certain acceleration (e.g., acceleration over a certain threshold level). Advantageously, the driveforce speed control system may reduce the ability to accelerate/decelerate as easily so the driver does not have to have as fine of motor control, and improves the speed and controllability of a vehicle during different driving conditions.

Figure 1:
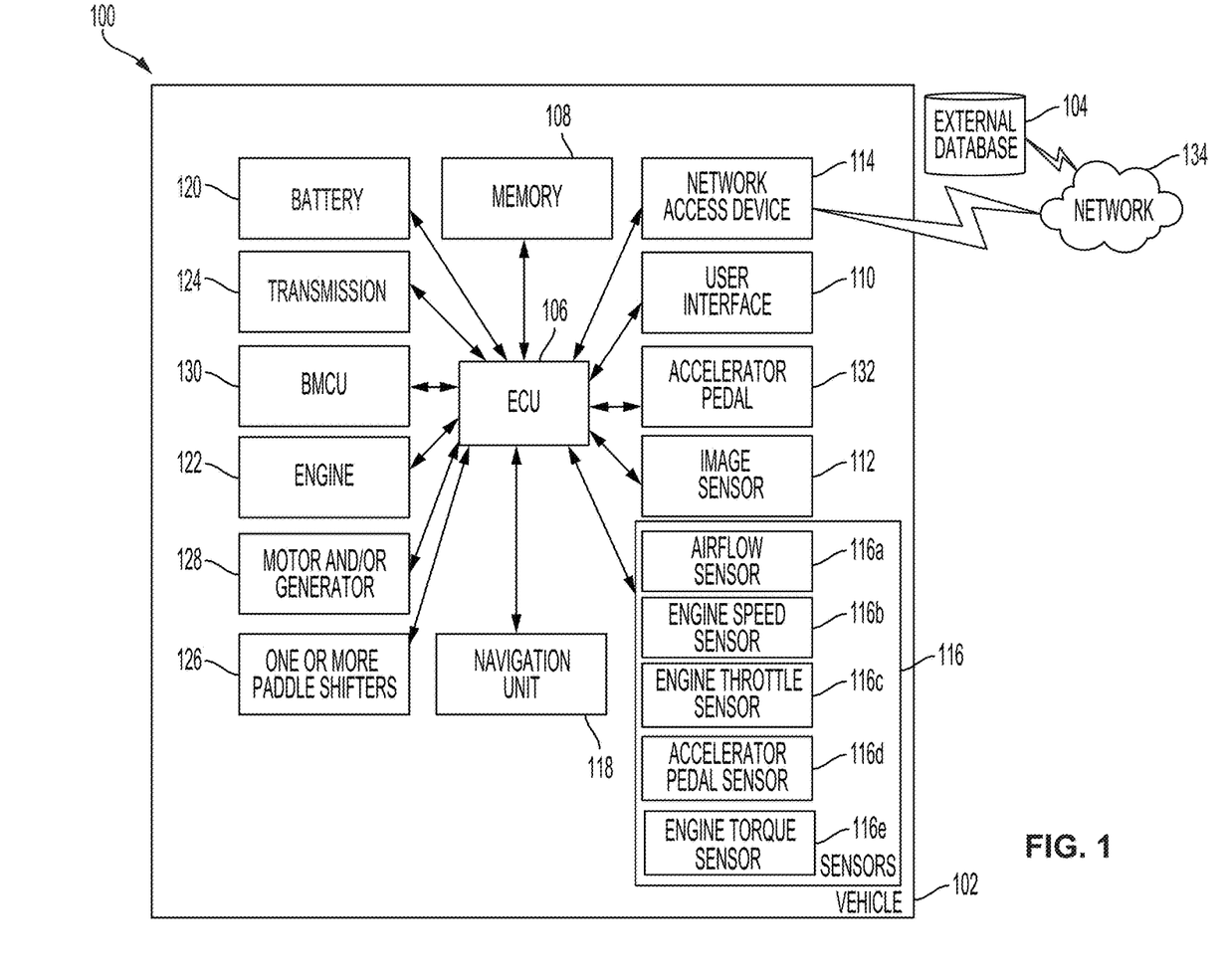
FIG. 1 is a block diagram of a driveforce speed control system according to an aspect of the invention.

FIG. 1 is a block diagram of a driveforce speed control system 100. The driveforce speed control system 100 or a portion thereof may be retro-fitted, coupled to, include or be included within a vehicle 102 or separate from the vehicle 102. The vehicle 102 may be a conveyance capable of transporting a person, an object, or a permanently or temporarily affixed apparatus. The vehicle 102 may be a self-propelled wheeled conveyance, such as a car, a sports utility vehicle, a truck, a bus, a van or other motor, battery or fuel cell driven vehicle. For example, the vehicle 102 may be an electric vehicle, a hybrid vehicle, a hydrogen fuel cell vehicle, a plug-in hybrid vehicle or any other type of vehicle that has a fuel cell stack, a motor and/or a generator. Other examples of vehicles include bicycles, trains, planes, or boats, and any other form of conveyance that is capable of transportation. The vehicle 102 may be semi-autonomous or autonomous. That is, the vehicle 102 may be self-maneuvering and navigate without human input. An autonomous vehicle may have and use one or more sensors and/or a navigation unit to drive autonomously.

The driveforce speed control system 100 may include or be coupled to a database 104. A database is any collection of pieces of information that is organized for search and retrieval, such as by a computer, and the database may be organized in tables, schemas, queries, reports, or any other data structures. A database may use any number of database management systems. The database 104 may include a third-party server or website that stores or provides information. The information may include real-time information, periodically updated information, or user-inputted information. A server may be a computer in a network that is used to provide services, such as accessing files or sharing peripherals, to other computers in the network. The database 104 may be located inside the vehicle 102. The database 104 may include an "Entry Condition Judgement" map (e.g., see FIG. 3). The "Entry Condition Judgement" may be utilized by the driveforce speed control system 100 to trigger the driveforce speed control system 100 to adjust the driveforce based on the driving conditions (e.g., see FIGS. 4A-4C). Further, the database 104 may include a driveforce map indicative of a deactivation process of the driveforce speed control system 100. The road load map may be downloaded by the driveforce speed control system 100.

The driveforce speed control system 100 includes one or more processors, such as the electronic control unit (ECU) 106. The one or more processors, such as the ECU 106, may be implemented as a single processor or as multiple processors. For example, the one or more processors may be a microprocessor, data processor, microcontroller or other controller, and may be electrically coupled to some or all the other components within the vehicle 102. The one or more processors may obtain sensor data from one or more sensors to determine when to adjust the pedal gain, as described herein.

The memory 108 may be coupled to the ECU 106. The memory 108 may include one or more of a Random Access Memory (RAM), a Read Only Memory (ROM) or other volatile or non-volatile memory. The memory 108 may be a non-transitory memory or a data storage device, such as a hard disk drive, a solid-state disk drive, a hybrid disk drive, or other appropriate data storage, and may further store machine-readable instructions, which may be loaded and executed by the ECU 106. The driveforce speed control system 100 may be configured to display an option to the driver (via a user interface) to activate or deactivate smart pedal learning.

The driveforce speed control system 100 may include a user interface 110. The user interface 110 may be part of the vehicle 102 or a vehicle head unit (not shown). The user interface 110 may include an input device that receives user input from a user interface element, a button, a knob, a dial, a keyboard, a mouse, a touchscreen, a microphone, or the like. The input device may receive input from a user of the vehicle 102 such as a driver or a passenger. The input device may receive, for example, information corresponding to a request for cruise control, information usable to control an auxiliary component on or within the vehicle 102 (e.g., to control a navigation device or a stereo), or the like. In some embodiments, the input device may include additional input device(s) usable to control the vehicle 102 such as an accelerator pedal, a brake pedal, a steering wheel, or the like. The input device may also receive information corresponding to a request for the vehicle 102 to drive autonomously.

The user interface 110 may include, provide or be coupled to an output device. The output device may include any output device such as a speaker, a display, a touchscreen, or the like. The output device may output data to a user of the vehicle 102. The output device may, for example, output information corresponding to a status of the pedal gain adjustment, a status of an environment surrounding the vehicle 102, and/or the like. Moreover, the output device may output information corresponding to a menu for selecting the desired driveforce map, for example.

In some embodiments, the user interface 110 may be a user interface device attached to or integrated with the vehicle 102 (e.g., an infotainment system configured to receive or output data). In some embodiments, the user interface 110 may be a user interface available on a remote device (not shown) such as, e.g., a smartphone, a tablet, or the like (e.g., which may be used to run a software program application to control various components on or within the vehicle 102) which may be connected to the vehicle 102 via wire or wirelessly. For example, the vehicle 102 may further include a transceiver or a network access device 114 which may be utilized to establish a wireless connection between the vehicle 102 and the remote device including the user interface 110. The wireless connection may be provided by any type of wireless connection known in the art such as, for example, Bluetooth, Wi-Fi, a cellular protocol, Zigbee, or any other communications (e.g., wireless) protocol. The network access device 114 may be referred to as a data communication module (DCM) and may communicate with any device or component included in the driveforce speed control system 100 and/or any remote device.

The driveforce speed control system 100 may include at least one image sensor 112. The image sensor 112 may be connected to the vehicle 102 and may detect image data (including, e.g., a plurality of images and/or videos) corresponding to an environment surrounding the vehicle 102, data corresponding to a speed limit, and/or the like. For example, the image sensor 112 may include a camera or any other image sensor capable of detecting image data (e.g., based on light having any wavelength). The image sensor 112 may include one or multiple image sensors which may be oriented to detect image data in any direction relative to the vehicle 102. For example, the image sensor 112 may detect image data relating to a speed limit sign and/or a road grade change. In some embodiments, the image sensor 112 may be attached on or within the vehicle 102. The at least one image sensor 112 may be positioned along the vehicle 102 wherever suitable to detect the image data.

The image sensor 112 may include one or more sensors capable of detecting a status of a vehicle component and/or an environment surrounding the vehicle 102. For example, the image sensor 112 may include a RADAR (Radio Detection and Ranging) detector or sensor, a LIDAR (Light Detection and Ranging) detector or sensor, a LASER Doppler based detector or sensor, and/or the like. In some embodiments, the image sensor 112 may be a single sensor, dual sensors, or a plurality of sensors. In various embodiments, the image sensor 112 may be integrated into the vehicle 102. In various embodiments, the image sensor 112 may be a separate component configured to be coupled to the vehicle 102.

The driveforce speed control system 100 may include the network access device 114. The network access device 114 may include a communication port or channel, such as one or more of a Dedicated Short-Range Communication (DSRC) unit, a Wi-Fi unit, a Bluetooth® unit, a radio frequency identification (RFID) tag or reader, or a cellular network unit for accessing a cellular network (such as 3G, 4G or 5G). The network access device 114 may transmit data to and receive data from the different components besides the driveforce speed control system 100, such as the vehicle 102 and/or the database 104.

The driveforce speed control system 100 may include one or more sensors 116. The one or more sensors 116 may include an airflow sensor 116a, an engine speed sensor 116b, an engine throttle sensor 116c and/or an accelerator pedal sensor 116d. The airflow sensor 116a may be positioned at an air inlet of the engine 122 and measure an amount of airflow and/or a rate of the airflow into the engine 122. The engine speed sensor 116b may measure a rotation speed of the crankshaft of the engine 122. The engine speed sensor 116b may measure the revolutions per minute (RPM) of the rotation of the engine crankshaft. The engine throttle sensor 116*c* may measure or determine the throttle position to determine the engine load. The accelerator pedal sensor 116*d* may be coupled to the accelerator pedal 132. The accelerator pedal sensor 116*d* may measure, detect or determine a position of the accelerator pedal 132 to determine the amount that the accelerator pedal 132 of the vehicle 102 is depressed. The one or more sensors 116 may include an engine torque sensor 116*e*. The engine torque sensor 116*e* may measure or determine the torque or the rotational force on the engine 122. The one or more sensors 116 may include one or more other sensors, such as a shift position sensor to detect the shift position or the gear position (i.e., which gear) of the transmission 124.

The driveforce speed control system 100 may be coupled to one or more vehicle components of the vehicle 102. The one or more vehicle components may include a navigation unit 118. The navigation unit 118 may be integral to the vehicle 102 or a separate unit. The vehicle 102 may include a Global Positioning System (GPS) unit (not shown) for detecting location data including a current location of the vehicle 102 and date/time information instead of the navigation unit 118. In some implementations, the ECU 106 may perform the functions of the navigation unit 118 based on data received from the GPS unit. The navigation unit 118 or the ECU 106 may perform navigation functions. Navigation functions may include, for example, route and route set prediction, providing navigation instructions, and receiving user input such as verification of predicted routes and route sets or destinations. The navigation unit 118 may be used to obtain navigational map information. The navigational map information may include a starting location of the vehicle 102, a current location of the vehicle 102, a destination location, a route between the starting location of the vehicle 102 and the destination location and/or date/time information.

The one or more vehicle components may include a motor and/or generator 128. The motor and/or generator 128 may convert electrical energy into mechanical power, such as torque, and may convert mechanical power into electrical energy. The motor and/or generator 128 may be coupled to the battery 120. The motor and/or generator 128 may convert the energy from the battery 120 into mechanical power, and may provide energy back to the battery 120, for example, via regenerative braking. The one or more vehicle components may include one or more additional power generation devices, such as an engine 122 or a fuel cell stack (not shown). The engine 122 combusts fuel to provide power instead of and/or in addition to the power supplied by the motor and/or generator 128.

The battery 120 may be coupled to the motor and/or generator 128 and may supply electrical energy to and receive electrical energy from the motor and/or generator 128. The battery 120 may include one or more rechargeable batteries and may supply the power to the driveforce speed control system 100.

The battery management control unit (BMCU) 130 may be coupled to the battery 120 and may control and manage the charging and discharging of the battery 120. The BMCU 130, for example, may measure, using battery sensors, parameters used to determine the state of charge (SOC) of the battery 120. The BMCU 130 may control the battery 120.

The one or more vehicle components may include a transmission 124. The transmission may have one or more gears, a drivetrain, a clutch and/or a drive shaft. The transmission 124 converts the power from the engine 122 to move the wheels of the vehicle 102. The one or more vehicle components may include one or more paddle shifters 126. The one or more paddle shifters may adjust a shift position of the gears within an automatic transmission. The one or more paddle shifters 126 may be manually depressed, pushed, pulled or otherwise positioned to manually change gears of the transmission 124 electrically.

The driveforce speed control system 100 may have or use a network 134 to communicate among different components, such as among the vehicle 102 and/or the database 104. The network 134 may be a Dedicated Short-Range Communication (DSRC) network, a local area network (LAN), a wide area network (WAN), a cellular network, the Internet, or combination thereof, that connects, couples and/or otherwise communicates among the different components of the driveforce speed control system 100.

Figure 2:
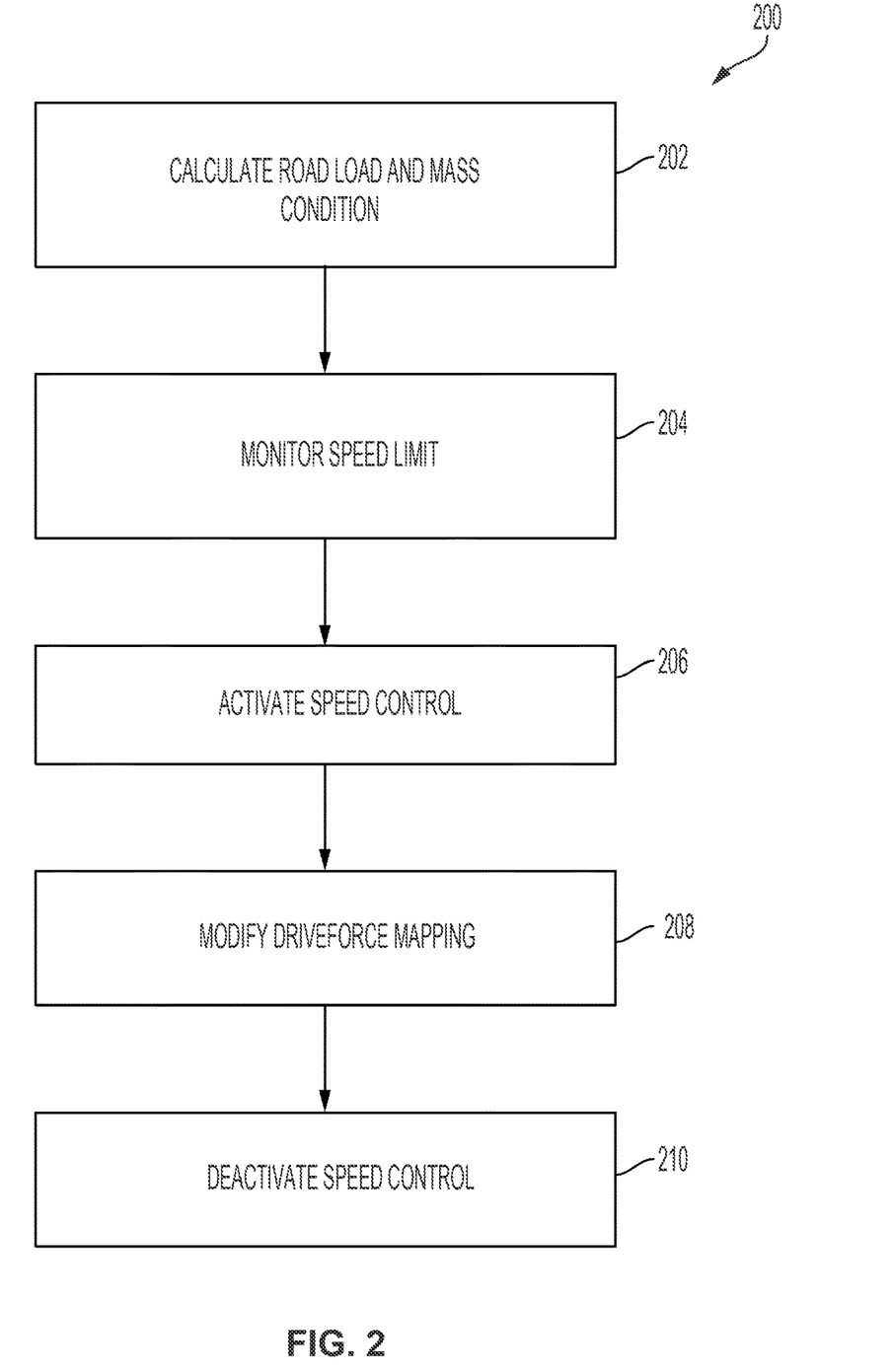
FIG. 2 shows a flow diagram of an example process for controlling the pedal driver using the driveforce speed control system of FIG. 1 according to an aspect of the invention.

FIG. 2 is a flow diagram of a method 200 for controlling the pedal driver to more easily maintain speed and compensate for changes in mass and/or road conditions. For instance, the method allows the acceleration for an increase or decrease in a pedal percentage to remain the same during all driving conditions, taking into account road conditions and vehicle conditions. This allows the pedal control for the driver to feel the same in all driving conditions. The drive force and the acceleration feeling dynamically changes to match the environment. Particularly, the method may reduce the ability to accelerate/decelerate as easily so the driver does not have to have as fine of motor control. This is especially important around a low pedal point (e.g., less than 20%) so the light touch does not effect the speed significantly.

At step 202, a road load (RL) and mass condition (MC) is calculated. The road load is the force required for the vehicle to accelerate, so if the vehicle is traveling on an incline or a decline, the mass of the vehicle may affect the RL. RL is a force curve, so as the vehicle speed increases, the amount of RL increases as well. Accordingly, the method monitors and estimates the RL and MC of the vehicle and current conditions. For example, the ECU records all instances of zero acceleration (e.g., steady speed) by storing the driving force from the powertrain and the physical grade condition. In other terms: RL_force=Driving_force−(mass*9.81 m/s$^2$*sin(grade)). This provides the RL force for a specific speed. Once enough points on the curve are recorded, an interpolation is performed to get the RL force for the specific vehicle. For example, if the vehicle has a trailer or a roof top storage device, the system accounts for physical changes in the vehicle. Further, mass recording may be performed during launch to enable the expected and actual acceleration to be used to compare the two values and back calculate the delta mass from the base nominal condition. Through these methods, the system determines the physical characteristics of the vehicle (e.g., if there is a difference from the base condition to account for the current vehicle condition).

At step 204, the method constantly monitors the speed limit. For instance, the method may monitor the speed limit through data from the GPS. The system utilizes the GPS data and known road information to determine the speed limit. In various embodiments, the method may monitor the speed limit through sensors (e.g., a camera) configured for sign detection. Accordingly, the speed limit is determined. In various embodiments, the driver may select what speed they want to maintain via a manual input.

Figure 3:
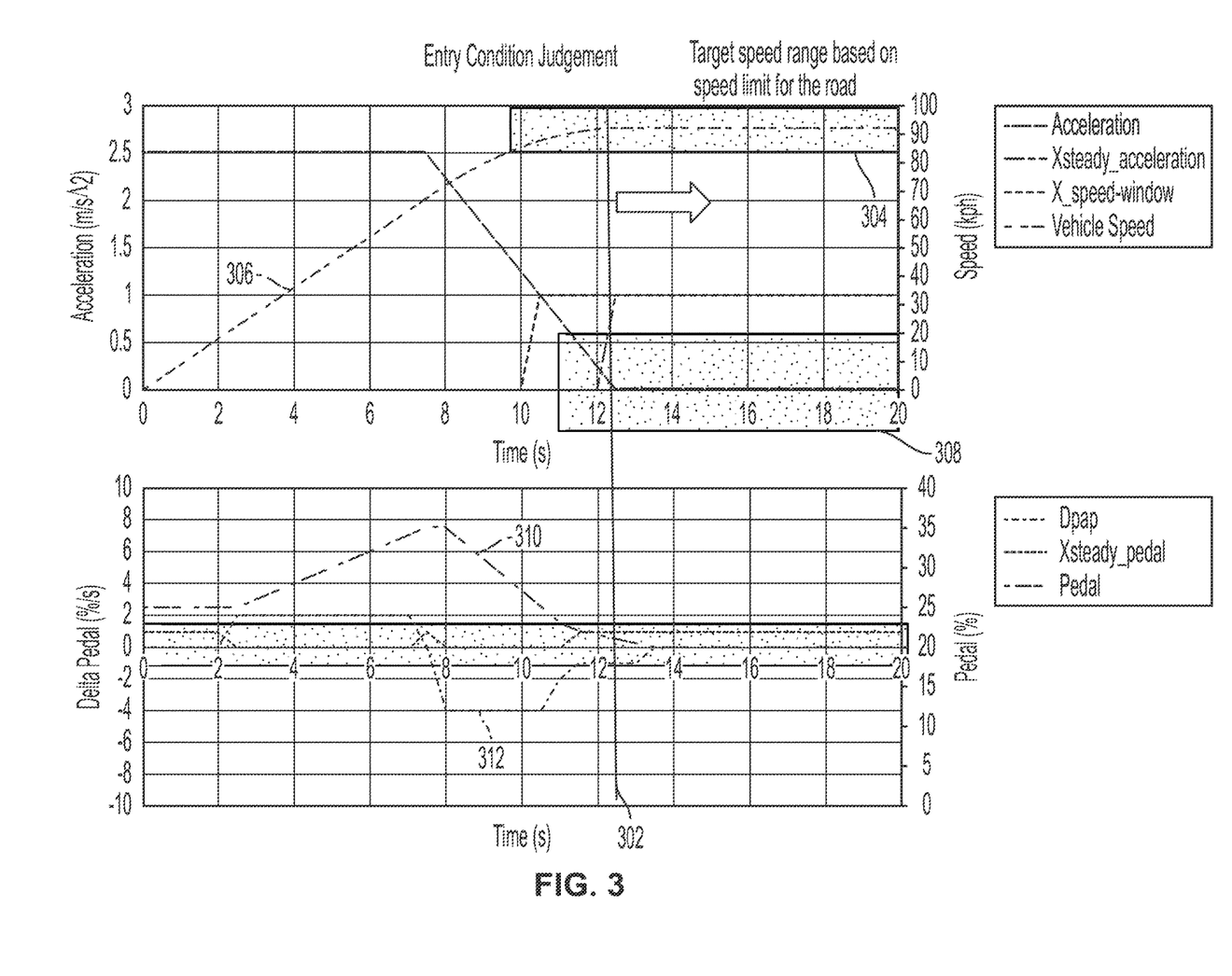
FIG. 3 is an example graph of a time chart of a steady condition recommended and/or required in order to begin the control activation using the driveforce speed control system of FIG. 1 according to an aspect of the invention.

At step 206, the speed limit control is activated. As illustrated in FIG. 3, a time chart example shows the type of steady condition that is required in order to begin the control activation. The initial phase is launching and hitting a target speed where then acceleration and pedal stabilize to a steady value. Both steady acceleration and steady pedal are needed to be met to activate the control. Once both steady acceleration and steady pedal occur (e.g., to the right of line 302) then the control can be activated to adjust the steady speed control. Additionally, the steady speed reached must be within the speed range of the target speed limit.

For instance, the driver starts driving as desired until a target speed is hit. The acceleration has to be within a tolerance for a certain amount of time. Once the acceleration is within a steady state for a threshold period of time and the speed has reached a steady state (shown within box 304), the system reaches the entry condition.

As an example, starting from point 306, or 0, a vehicle may accelerates at 2.5 m/s$^2$ for 7 seconds, thus acceleration is constant, and speed is constantly increasing. The Xsteady_acceleration is 0 until that point. Then deceleration decreases until the Xsteady_acceleration is triggered. The target speed, for example, is 92 MPH. FIG. 3 shows acceleration to that level, as the vehicle approaches the target speed, the driver releases the pedal so deceleration drops to 0 when holding steady speed. Then once at a steady speed, the Xsteady_acceleration is triggered. A tolerance level is illustrated within box 308. A tolerance for steady acceleration is provided as well as is may be impossible to hold zero precisely. In sum, Xsteady_acceleration is a flag to show the target speed and zero acceleration is reached.

Still referring to FIG. 3, pedal indicator 310 illustrates a regular pedal usage out of 100%. For instance, FIG. 3 illustrates a pedal press starting at 25%. When it is maintained, the pedal position does not change and the delta pedal doesn't change (e.g., line 312 is 0). Then after 2 seconds, the pedal percentage increases, thus line 312 increase as well. Because there is a change in delta pedal, the Xsteady_pedal indication is 0 because it is not steady. When the driver releases the gas pedal, the pedal press line decreases on the map, so Xsteady spikes before returning to 0. Once the pedal becomes constant, Dpap is constant, and so is Xsteady_pedal. In order to trigger the control, both Dpap and Xsteady_pedal should both be 1 for a threshold period of time (e.g., 1-2 seconds). Thus, when the conditions are met the ECU automatically activates the control. In various embodiments, the driver may activate the control via the user interface.

Figure 4A:
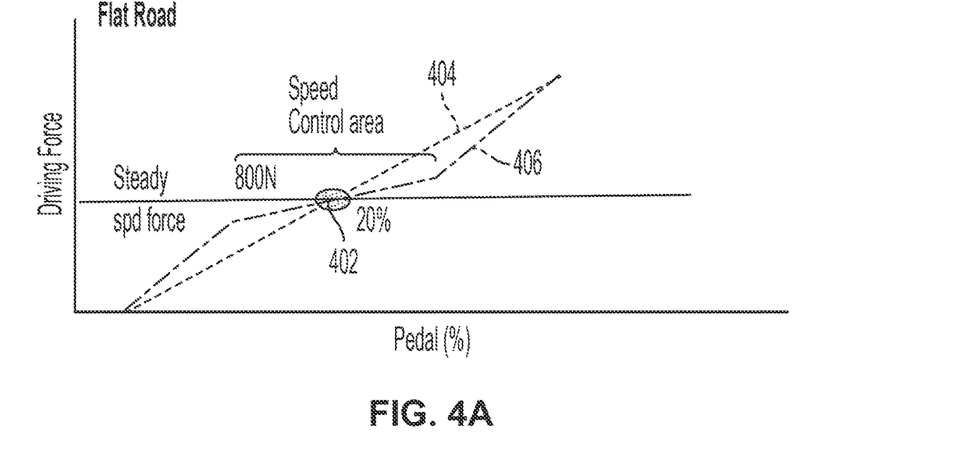
FIGS. 4A-4C are example graphs of drive force maps of the driveforce speed control system of FIG. 1 according to an aspect of the invention.
Figure 4B:
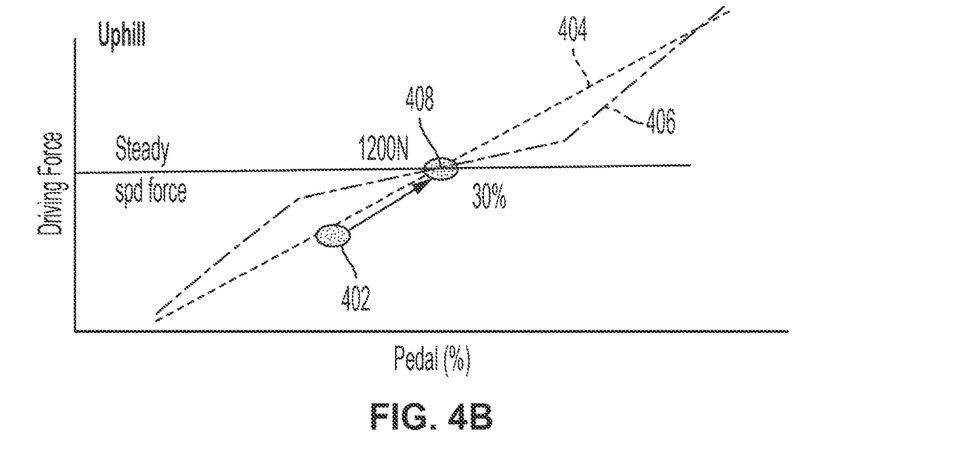
Figure 4C:
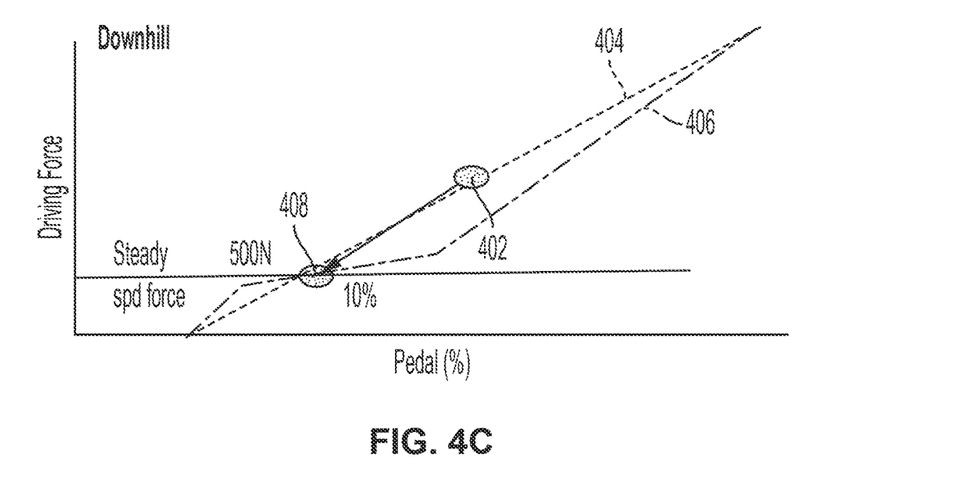

At step 208, once the system is active, the system dynamically modifies the drive force mapping. As shown in FIGS. 4A-4C, various drive force maps may be provided. For example, FIGS. 4A-4C illustrated when the road grade is not changing, when the road grade is increasing (e.g., road load point is increasing), and when the grade is decreasing (e.g., the road point is decreasing), respectively. When the control becomes active based on the steady speed and the pedal judgment (e.g., step 3), the system adjusts the pedal to driving force mapping for improved speed control. When the pedal is steady at the RL point for a threshold time duration, the mapping is changed to allow more speed control area. If the road grade changes to uphill as the driver rolls onto the pedal to maintain speed, the system may wait for the threshold time at the new road load point, including the grade, and then activate the new drive force map. If the road grade changes to more downhill as the driver rolls out of the pedal to maintain steady speed, wait for a threshold time at the new road load point, then activate the new drive force map. When the control is active, the user interface may display a steady speed control icon on the dash to make the driver aware of the changes.

Once the respective drive force map is selected, the system is adjusted accordingly. For instance, at the low end of the map, the system may still drive more aggressively to reach a higher force below the road load point in an earlier part of the pedal press, and at the high end, the driver may experience a duller force through the pedal to create a shallower slope of drive force. In other words, once the pedal press meets point 402, the map changes to make the gas pedal less sensitive. For comparison, a line 404 illustrated an original mapping and a line 406 illustrates modified mapping. Further, as a driver approaches an uphill, the driver tendency is to press the pedal to hit new steady speed force. The control function of the system will likely be broken/cancelled at some point (e.g., when the press exceeds a threshold), for instance at point 408. Accordingly, the system returns to step 206 to determine a new steady state. Additionally, the downhill map is provided with a minimum RL (10%) so then 0 (e.g., coasting downhill) does not trigger the system to control when it is not desired by the driver.

Figure 5A:
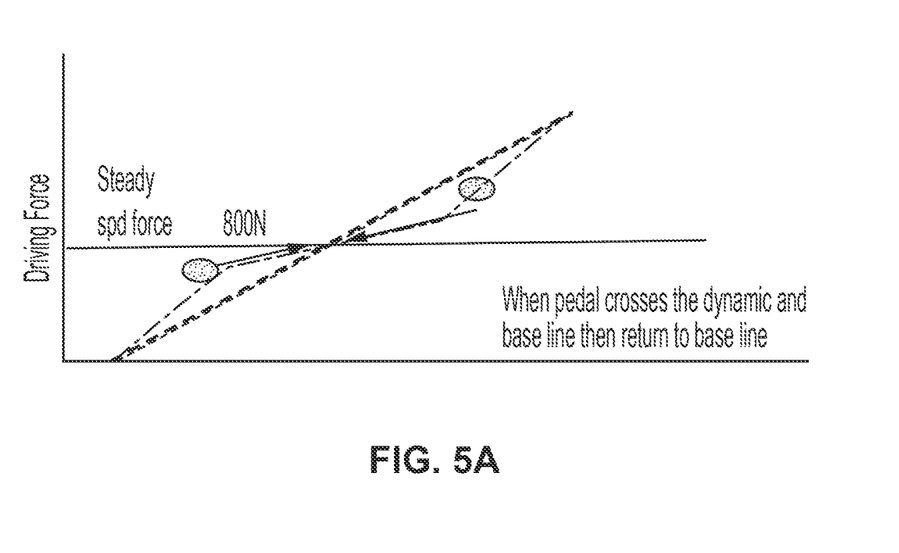
FIGS. 5A-5D are example graphs of a logic for deactivation using the driveforce speed control system of FIG. 1 according to an aspect of the invention.

At step 210, deactivation of the control may occur. For instance, deactivation may be triggered when a heavy acceleration event occurs over a certain level (e.g., acceleration over a certain level). For instance, control may cancel if the acceleration is above and/or below a certain threshold, control may cancel if the pedal is above a certain threshold, control may cancel if the delta pedal is above a certain threshold, and/or control may cancel if the brake is above a certain threshold. At a control cancel hold, the current map is maintained until the pedal is released back to the original crossing point of the base map and the dynamic map (e.g., see FIG. 5A). This prevents the torque increase with a steady pedal.

Figure 5B:
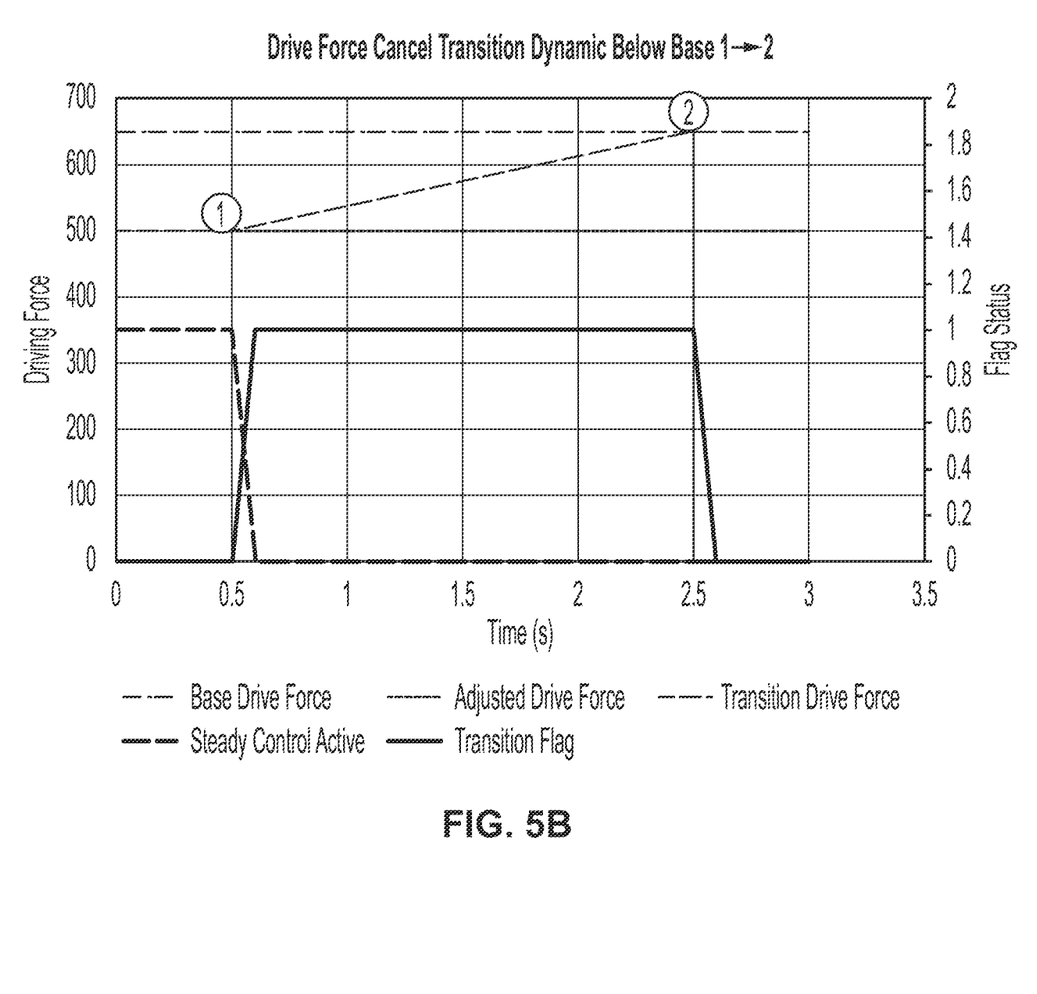
Figure 5C:
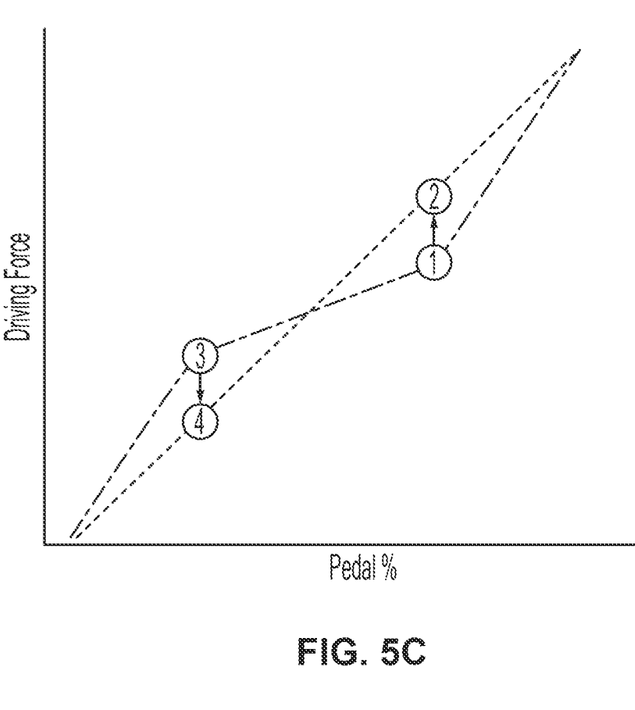
Figure 5D:
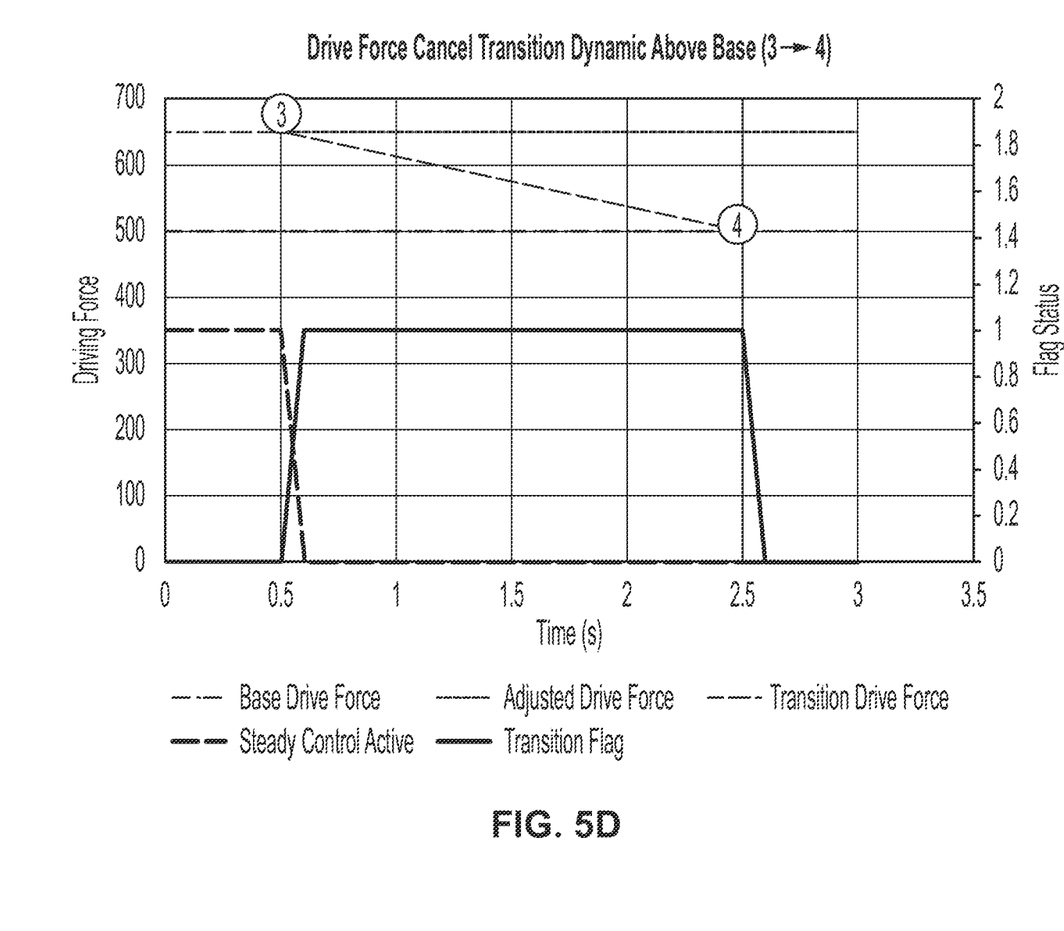

Further, a logic for the transition to cancel is illustrated in FIGS. 5B-5D between point 1 and point 2, and between point 3 and point 4. For instance, when delta pedal is above and/or below a certain threshold, the system is canceled. A minimum and maximum threshold are predetermined for both the pedal and delta pedal to cancel control. The system may be configured to determine a time average to determine whether the pedal press or the delta pedal affects the cancellation in order to provide a smoother transition to regular mapping position.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A driveforce speed control system for a vehicle, comprising:
   a sensor configured to detect a speed limit; and
   an electronic control unit (ECU) coupled to the sensor and configured to:
      determine a speed limit based on the sensor; and
      activate a speed control in response to:
         the vehicle operating in a steady accelerator pedal press condition for a threshold period of time, and
         the vehicle being within a predetermined range of the speed limit.

2. The driveforce speed control system of claim 1, wherein the ECU is further configured to record all instances of zero acceleration by collecting a driving force from a powertrain of the vehicle and a physical road grade condition.

3. The driveforce speed control system of claim 2, wherein the ECU is further configured to interpolate a road load of the vehicle based on the recorded instances of zero acceleration.

4. The driveforce speed control system of claim 1, wherein the sensor is an image sensor such that the speed limit is detected based on image data from the sensor.

5. The driveforce speed control system of claim 1, further comprising a Global Positioning System (GPS) unit for detecting location data.

6. The driveforce speed control system of claim 5, wherein the ECU is further configured to determine the speed limit based on the location data.

7. The driveforce speed control system of claim 1, wherein the speed control is activated in response to the vehicle further operating in a steady acceleration condition.

8. The driveforce speed control system of claim 1, wherein the ECU is further configured to dynamically modify a driveforce mapping of the vehicle in response to the speed control being activated.

9. The driveforce speed control system of claim 8, wherein the driveforce mapping is modified based on a road grade.

10. The driveforce speed control system of claim 1, wherein the ECU is further configured to deactivate the speed control in response to at least one of a change in acceleration over a first predetermined threshold, a pedal press being above a second predetermined threshold, a delta pedal press is above a third predetermined threshold, or a brake is above a fourth predetermined threshold.

11. A method for controlling a pedal to driveforce mapping of a vehicle to maintain speed and compensate for changes in mass and road conditions, the method comprising:
calculating a road load and a mass condition;
determining a speed limit; and
activating a speed control in response to the vehicle operating in a steady accelerator pedal press condition for a threshold period of time and the vehicle being within a predetermined range of the determined speed limit, the speed control being based on the calculated road load and the calculated mass condition.

12. The method of claim 11, wherein the ECU is further configured to record all instances of zero acceleration by collecting a driving force from a powertrain of the vehicle and a physical road grade condition, wherein the ECU is further configured to interpolate the road load based on the recorded instances of zero acceleration.

13. The method of claim 11, further comprising determining the speed limit based on at least one of sensor data or location data.

14. The method of claim 11, further comprising activating the speed control in response to the vehicle further operating in a steady acceleration condition.

15. The method of claim 11, further comprising dynamically modifying a driveforce mapping of the vehicle in response to the speed control being activated, wherein the driveforce mapping is modified based on the road grade.

16. The method of claim 11, further comprising deactivating the speed control in response to at least one of a change in acceleration over a first predetermined threshold, a pedal press being above a second predetermined threshold, a delta pedal press is above a third predetermined threshold, or a brake is above a fourth predetermined threshold.

* * * * *